(12) United States Patent
Seibold et al.

(10) Patent No.: US 8,783,773 B2
(45) Date of Patent: Jul. 22, 2014

(54) WELDABLE ATTACHMENT MECHANISMS

(75) Inventors: Kurt A. Seibold, Whitemore Lake, MI (US); Carlos F. Lopez, Ypsilanti, MI (US); Timothy S. Myers, Northville, MI (US); Gregory V. Steinke, Brighton, MI (US)

(73) Assignee: Johnson Controls Technology Corporation, Holland, MI (US)

( * ) Notice: Subject to any disclaimer, the term of this patent is extended or adjusted under 35 U.S.C. 154(b) by 378 days.

(21) Appl. No.: 13/061,479

(22) PCT Filed: Sep. 15, 2009

(86) PCT No.: PCT/US2009/056979
§ 371 (c)(1),
(2), (4) Date: Feb. 28, 2011

(87) PCT Pub. No.: WO2010/033501
PCT Pub. Date: Mar. 25, 2010

(65) Prior Publication Data
US 2011/0156461 A1 Jun. 30, 2011

Related U.S. Application Data

(60) Provisional application No. 61/098,135, filed on Sep. 18, 2008.

(51) Int. Cl.
*B60N 2/00* (2006.01)
*F16D 1/072* (2006.01)
*F16B 37/06* (2006.01)

(52) U.S. Cl.
USPC ......... 297/354.1; 403/282; 411/171; 411/501

(58) Field of Classification Search
USPC ......... 297/354.1; 403/274–285; 411/171, 501
See application file for complete search history.

(56) References Cited

U.S. PATENT DOCUMENTS

| | | | | |
|---|---|---|---|---|
| 2,784,758 | A | * | 3/1957 | Rohe .............................. 411/171 |
| 4,770,463 | A | * | 9/1988 | Nishino ..................... 297/367 R |
| 5,015,136 | A | * | 5/1991 | Vetter et al. ................... 411/504 |
| 5,156,439 | A | * | 10/1992 | Idlani et al. ............... 297/367 R |

(Continued)

FOREIGN PATENT DOCUMENTS

| | | |
|---|---|---|
| DE | 42 04 693 A1 | 9/1993 |
| DE | 42 04 693 C2 | 10/1996 |

(Continued)

OTHER PUBLICATIONS

International Search Report mailed Feb. 12, 2009 for PCT/US2009/056979.
Chinese Second Office Action mailed May 20, 2013.
Chinese Office Action dated Nov. 6, 2013.
Japanese Office Action dated Jan. 7, 2014.

*Primary Examiner* — Sarah B McPartlin
(74) *Attorney, Agent, or Firm* — Fletcher Yoder, P.C.

(57) ABSTRACT

Attachment mechanisms are provided that may be riveted on one end and welded on another flanged end. The flanges may allow the rivets to be welded to a frame or other part without additional support plates. In certain embodiments, the rivets may simplify manufacturing and packaging as well as reduce the weight of the attachment mechanism. The attachment mechanisms may promote load distribution, allow for the use of thinner materials, facilitate attachment to heat treated materials, allow for attachment of parts that are difficult to access, reduce fixturing, and improve manufacturing efficiency, among other things.

20 Claims, 5 Drawing Sheets

(56) References Cited

U.S. PATENT DOCUMENTS

| | | | |
|---|---|---|---|
| 5,980,147 A * | 11/1999 | Journee | 403/119 |
| 6,113,191 A | 9/2000 | Seibold | |
| 6,394,525 B1 | 5/2002 | Seibold | |
| 6,402,777 B1 * | 6/2002 | Globerman et al. | 623/1.11 |
| 6,409,263 B1 | 6/2002 | Seibold | |
| 6,499,924 B2 * | 12/2002 | Kilian et al. | 411/176 |
| 6,578,919 B2 | 6/2003 | Seibold et al. | |
| 6,601,900 B1 | 8/2003 | Seibold | |
| 6,644,744 B2 | 11/2003 | Seibold | |
| 6,863,347 B2 | 3/2005 | De Nichilo | |
| 6,920,820 B2 * | 7/2005 | Meggison et al. | 99/422 |
| 7,255,399 B2 | 8/2007 | White et al. | |
| 7,387,333 B2 | 6/2008 | Seibold | |
| 7,461,889 B1 | 12/2008 | Sahraei | |

FOREIGN PATENT DOCUMENTS

| | | |
|---|---|---|
| DE | 198 39 883 A1 | 3/2000 |
| DE | 100 12 009 A1 | 9/2001 |
| DE | 103 39 788 A1 | 3/2004 |
| DE | 103 18 551 B4 | 7/2005 |
| DE | WO 2006/005629 A2 | 1/2006 |
| DE | 602 12 779 T2 | 6/2007 |
| DE | 198 13 517 B4 | 6/2008 |
| FR | 2 438 448 A1 | 5/1980 |
| FR | 2 828 454 A1 | 2/2003 |
| JP | 07304363 | 11/1995 |
| JP | 2006199049 | 8/2006 |

* cited by examiner

WELDABLE ATTACHMENT MECHANISMS

CROSS REFERENCE TO RELATED APPLICATIONS

This application claims priority from and the benefit of U.S. Provisional Application Ser. No. 61/098,135, entitled "WELDABLE ATTACHMENT MECHANISMS," filed Sep. 18, 2008, which is hereby incorporated by reference.

BACKGROUND

The invention relates generally to weldable attachment mechanisms.

Attachment mechanisms may be used to affix parts within many applications. For example, in seating assemblies, attachment mechanisms may be used to attach parts within the seating assembly or to attach the seating assembly to a mounting track. In certain applications, attachment mechanisms may be used in vehicle seating assemblies to affix the seat back to the seat bottom. The attachment mechanisms may allow the seat back to recline with respect to the seat bottom and/or may allow the seat to fold to increase vehicle storage capacity. Accordingly, it may be desirable for the attachment mechanisms to have sufficient strength to accommodate repeated movements. Further, as the desire for fuel-efficient vehicles continues to increase, it may be desirable for the attachment mechanisms to be lightweight. Moreover, in certain applications, it may be desirable to reduce the number of parts used in attachment mechanisms to facilitate manufacturing and packaging. Further, it also may be desirable to provide attachment strength and repeatability, to reduce heat distortion, to reduce fixturing, and/or to create offsets.

SUMMARY

The present invention provides innovative attachment mechanisms designed to respond to such needs. The attachment mechanisms may include one or more rivets with flanges for welding an attachment mechanism or other structure to a frame. In certain embodiments, the flanges may provide a surface area for welding without the use of additional support plates.

In one embodiment, the present invention relates to a riveted assembly including a rotatable seat back member, a rotational joint member, and a mount member. The riveted assembly also includes a first rivet having a first rivet portion secured to the rotational joint member, a first standoff portion having a first shoulder substantially surrounding the rivet portion and bearing against the rotational joint member, and a first flange portion having a first side and a second side opposite the first side. The first side is secured to an end of the first standoff portion opposite the first shoulder and the second side has a weld surface welded to the rotatable seat back member. The riveted assembly further includes a second rivet having a second rivet portion secured to the rotational joint member, a second standoff portion having a second shoulder substantially surrounding the rivet portion and bearing against the rotational joint member, and a second flange portion having a third side and a fourth side opposite the third side, the third side being secured to an end of the second standoff portion opposite the shoulder and the fourth side having a weld surface welded to the seat back member. The second rivet also has an intermediate standoff portion between the second shoulder and the second flange portion, the intermediate standoff portion having an intermediate shoulder and the intermediate standoff portion receiving the stationary mount member against the second shoulder to permit rotation of the rotatable seat back member and the rotational joint member together with respect to the mount member about a central axis of the second rivet.

In another embodiment, the present invention relates to a riveted assembly. The riveted assembly includes a rivet having a rivet portion, a standoff portion having a shoulder substantially surrounding the rivet portion, and a flange portion having a first side and a second side opposite the first side, the first side being secured to an end of the standoff portion opposite the shoulder and the second side having a weld surface. The riveted assembly also includes a first structural member secured to the rivet portion by riveting of the rivet portion, the first structural member bearing against the shoulder. The riveted assembly further includes a second structural member welded to the weld surface of the flange portion and spaced from the first structural member by the standoff portion.

In yet another embodiment, the present invention relates to a weldable rivet. The weldable rivet includes a rivet portion configured to be riveted to a first structural member, a standoff portion having a shoulder substantially surrounding the rivet portion to receive the first structural member, and a flange portion having a first side and a second side opposite the first side. The first side is secured to an end of the standoff portion opposite the shoulder and the second side has a weld surface configured to be joined to a second structural member by welding on a side thereof opposite the standoff portion.

DETAILED DESCRIPTION

The present disclosure is directed to attachment mechanisms including weldable rivets. The weldable rivets may include a rivet portion that may be riveted to a first structural component and a flange portion that may be welded to a second structural component. A standoff portion may separate the rivet portion from the flange portion and may include a shoulder for receiving the first structural component. In certain embodiments, the weldable rivets also may include an intermediate standoff portion for receiving a third structural component. The intermediate standoff portion may be a bearing surface allowing movement of the first structural component with respect to the third structural component. For example, the first structural component may rotate around the intermediate standoff portion and/or slide about the intermediate standoff portion.

The attachment mechanisms shown in FIGS. 1 through 14 may be used in a wide variety of applications that may benefit from both riveting and welding. For example, riveting may promote attachment to heat treated components or may provide offsets, while welding can increase load distribution or provide manufacturing efficiencies. The combination of riveting and welding to flanges on rivets also may reduce fixturing, ease manufacturing, and improve accessibility, among other things. For example, in certain embodiments, the flanges may allow the rivets to be welded on either surface of the flange, allowing welding to be performed from either side of the rivet. In another example, the flanges may distribute the load from the attachment mechanism, reducing the need for a separate support piece coupled to the attachment mechanism. In another example, the relative thinness of the flanges may show disruptions, facilitating visual inspection of the welds. Further, the relative thinness of the flanges may reduce the weight of the weldable rivet while providing a sufficient welding surface. The attachment mechanisms generally include rivets that may be riveted on one end and welded on the other end, such as by laser welding.

Although the attachment mechanisms may be employed in a wide variety of applications, the attachment mechanisms may be particularly well suited for use in attachment mechanisms for vehicle seat assemblies. For example, the attachment mechanisms may be employed to attach a seat back to a seat bottom. Further, the attachment mechanisms may allow the seat back to fold flat onto the seat bottom to facilitate storage or removal of the vehicle seat. In certain embodiments, the attachment mechanisms may include weldable rivets securing a frame of the seat back to a rotational joint that enables the seat back to fold flat onto the seat bottom. In other embodiments, the attachment mechanisms may include weldable rivets securing a recliner plate of the seat assembly to the seat back to enable reclining of the seat back with respect to the seat bottom. In yet other embodiments, the attachment mechanisms may include weldable rivets securing a vehicle seat assembly to a vehicle mounting track disposed on the floor of a vehicle. The weldable rivets employed in the attachment mechanisms may be particularly useful for securing structural components where movement, such as rotation or sliding, is desired, and/or where an offset is desired between the structural components.

Figure 1:
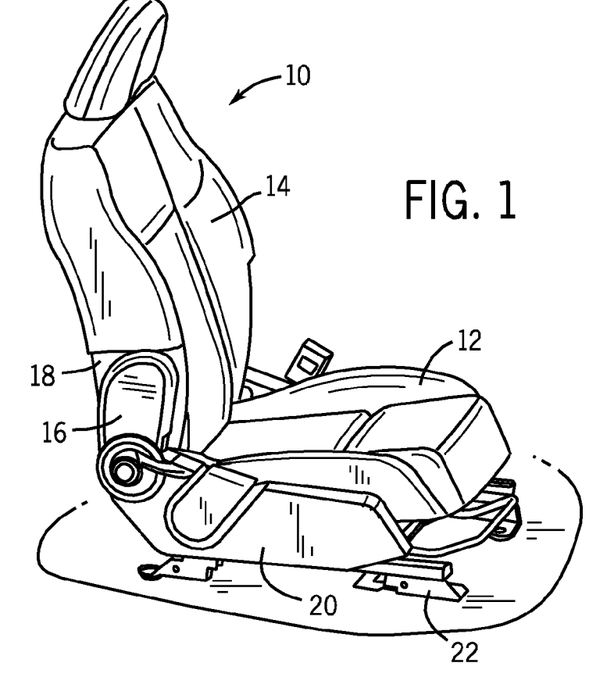
FIG. 1 is perspective view of an embodiment of a seat assembly that may employ attachment mechanisms.

FIG. 1 depicts an exemplary application for the attachment mechanisms within a seat assembly 10. As may be appreciated, the attachment mechanisms may be employed in a wide variety of applications and seat assembly 10 is provided by way of example and is not intended to be limiting. In certain exemplary embodiments, the seat assembly 10 may be disposed within a motor vehicle. The seat assembly 10 includes a seat bottom 12 and a seat back pivotally connected by attachment mechanisms 16. The seat assembly 10 may generally include a pair of attachment mechanisms 16 disposed on opposite sides of the seat assembly 10. The attachment mechanisms 16 may be attached to side frames 18 of the seat back and may be attached to a lower frame 20 of the seat bottom 12. In certain embodiments, the attachment mechanisms 16 may allow the seat back 14 to recline with respect to the seat bottom 12. The attachment mechanisms 16 also may allow the seat back 14 to incline and fold towards the seat bottom 12. The lower frame 20 also may be attached to a mounting track 22 that may be disposed on the floor of a vehicle. The mounting track 22 may provide lateral and/or vertical adjustment of the seat assembly 10 with respect to the vehicle floor.

Figure 2:
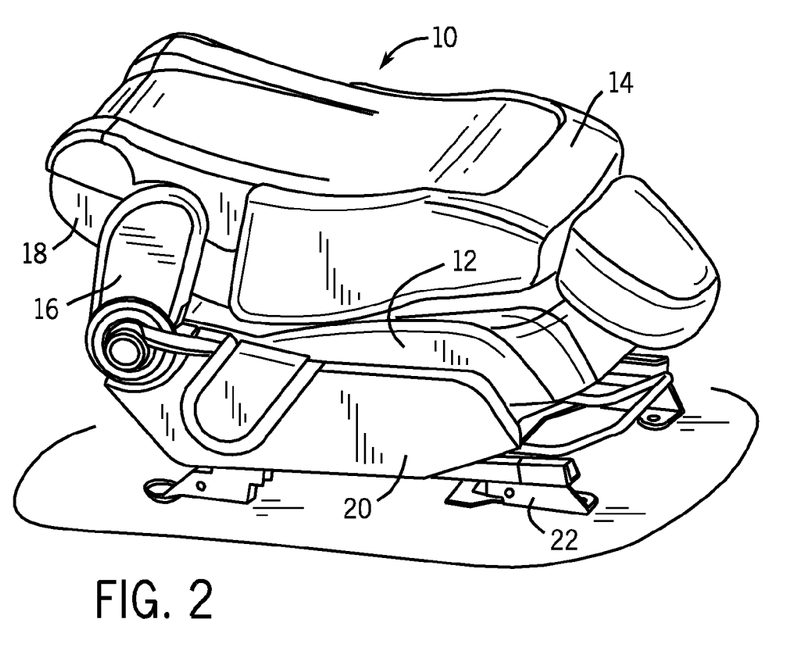
FIG. 2 is a perspective view of the seat assembly of FIG. 1 in the folded position.

FIG. 2 depicts the seat assembly 10 in a flat folded position. The seat back 14 has been inclined towards the seat bottom 12 to allow the seat back 14 to lay flat on top of the seat bottom 12. The flat folded position may provide additional storage options within a vehicle and/or may facilitate removal of the seat assembly 10 from the vehicle.

Figure 3:
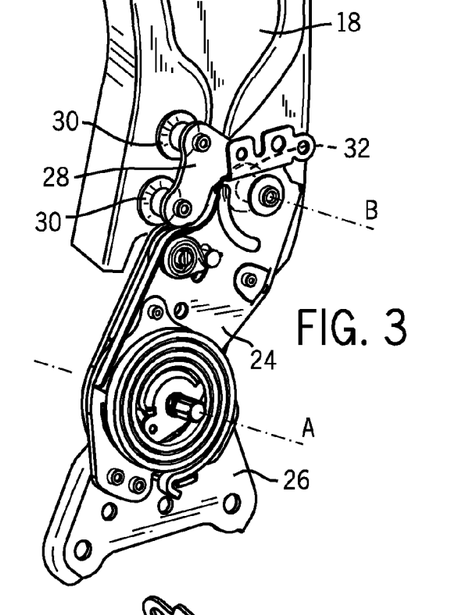
FIG. 3 is a perspective view of an attachment mechanism attached to a side member of the seat assembly of FIG. 1.

FIG. 3 depicts the outboard side of one of the attachment mechanisms 16 attached to one of the side frames 18. The attachment mechanism 16 includes an intermediate member 24 connected to a lower member 26 and an upper member 28. Lower member 26 may be connected to the seat bottom through the bottom frame, and upper member 28 may be connected to the seat back through side frame 18. Intermediate member 24 includes two axes of rotation for the seat assembly. Specifically, intermediate member 24 may rotate with respect to the lower member 26 about an axis of rotation A to allow the seat back to recline with respect to the seat bottom. Intermediate member 24 also may rotate with respect to upper member 28 about an axis of rotation B to allow the seat back to incline to the fold flat position shown in FIG. 2.

Figure 4:
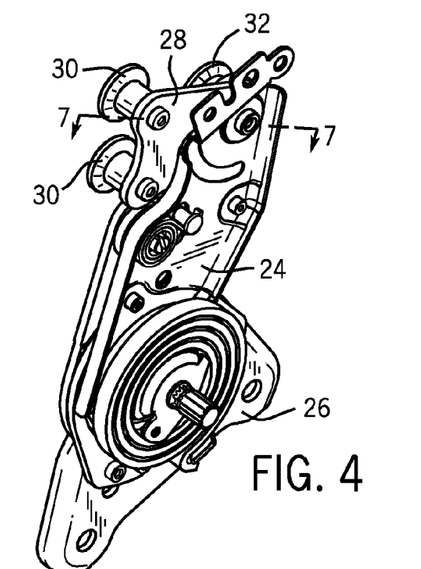
FIG. 4 is a perspective view of the outboard side of the attachment mechanism of FIG. 3.

FIG. 4 is a perspective view of the outboard side of attachment mechanism 16. Upper member 28 includes rivets 30 and 32 for connecting attachment mechanism 16 to the seat assembly. Specifically, rivets 30 extend through upper member 28 and may be riveted, or otherwise affixed to the outboard side of upper member 28. A rivet 32 extends through upper member 28 and intermediate member 24 and may be rotatably attached to intermediate member 24, for example, using a top hat washer. The opposite ends of rivets 30 and 32 may be welded, or otherwise affixed to the outboard side of the side frame of the seat assembly.

Figure 5:
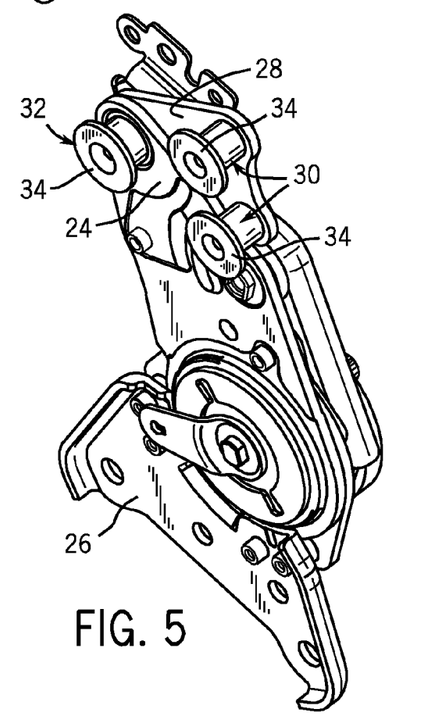
FIG. 5 is a perspective view of the inboard side of the attachment mechanism of FIG. 3.

FIG. 5 is a perspective view of the inboard side of attachment mechanism 16. Rivets 30 and 32 each include an integral flange 34 that may provide a surface for affixing rivets 30 and 32 to the frame of the seat assembly. Flanges 34 are intended to provide a large enough surface area so that the rivets 30 and 32 may be attached to the side frame without the need for an additional plate or support. According to exemplary embodiments, rivets 30 and 32 may be laser welded to the frame. For example, the rivets may be clamped to the side frame and laser welded through the side frame to fuse the rivets to the side frame. Of course, the rivets may be welded from either direction; through the side frame or through the flanges on the rivets. The flanges are also intended to distribute the load from the attachment mechanism across the side frame, which may increase the amount of torque that can be applied to the attachment mechanism. Further, depending on the specific application and manufacturing constraints, the number and size of the rivets may vary.

Figure 6:
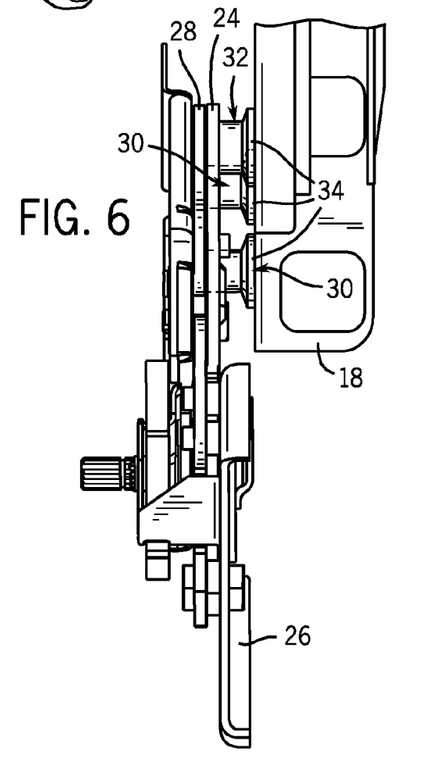
FIG. 6 is a side view of the attachment mechanism of FIG. 3.

FIG. 6 is a side view of attachment mechanism 16 illustrating the extension of rivets 30 and 32 through attachment mechanism 16. As noted above with respect to FIG. 4, rivets 30 extend through upper member 28 and rivet 32 extends through upper member 28 and intermediate member 24.

Figure 7:
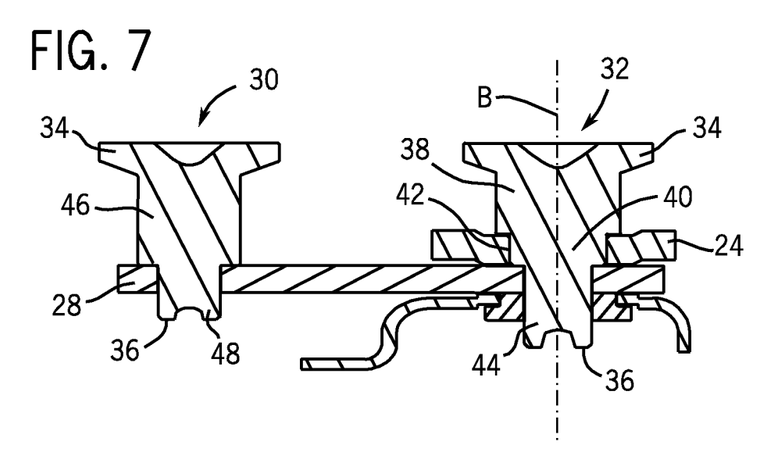
FIG. 7 is a cross section of the rivets of the attachment mechanism of FIG. 3.

FIG. 7 is a cross-sectional view taken through rivets 30 and 32 within attachment mechanism 16. Rivets 30 and 32 include ends 36 for riveting or otherwise affixing the rivets to upper member 28. Rivet 30 further includes a first standoff section 38 and a second standoff section 40 that separate flange 34 from intermediate member 24. Intermediate member 24 may be disposed around a rotational bearing 42 of rivet 30. Rotational bearing 42 may allow intermediate member 24 and rivet 30 to rotate with respect to each other. Upper member 28 may be disposed around a third standoff section 44 of rivet 30. Rivet 30 includes a first standoff section 46 and a second standoff section 48 that separate flange 34 from upper member 28. Upper 28 may be disposed around the second standoff section 48. For both rivets 30 and 32, standoff sections 38 and 46 have a smaller cross-sectional area than flanges 34. The smaller cross-sectional area of standoff sections 38 and 46 may decrease the weight of the rivets while still providing a sufficient area for attachment through flanges 34.

Figure 8:
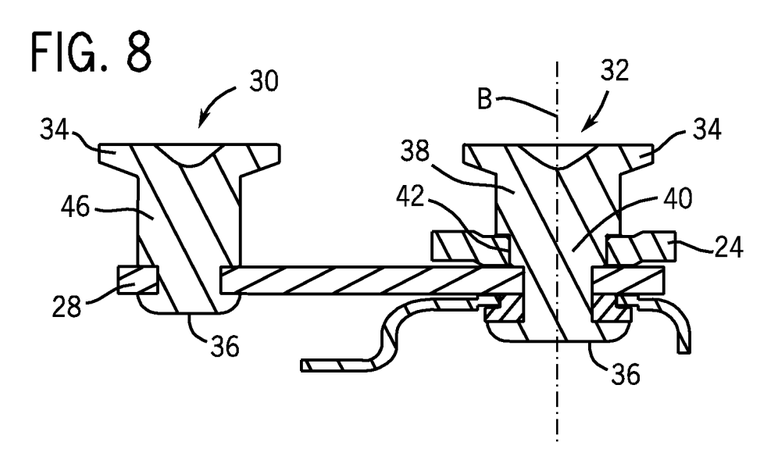
FIG. 8 is a cross section of the rivets of FIG. 7 after staking.

FIG. 8 is a cross-sectional view taken through rivets 30 and 32 after staking to illustrate the assembled condition. Specifically, ends 36 of rivets 30 and 32 have been staked, for example, using a rivet staking tool or a rivet staking machine, to couple rivets 30 and 32 to upper member 28.

Figures 9, 10, 11, 12:
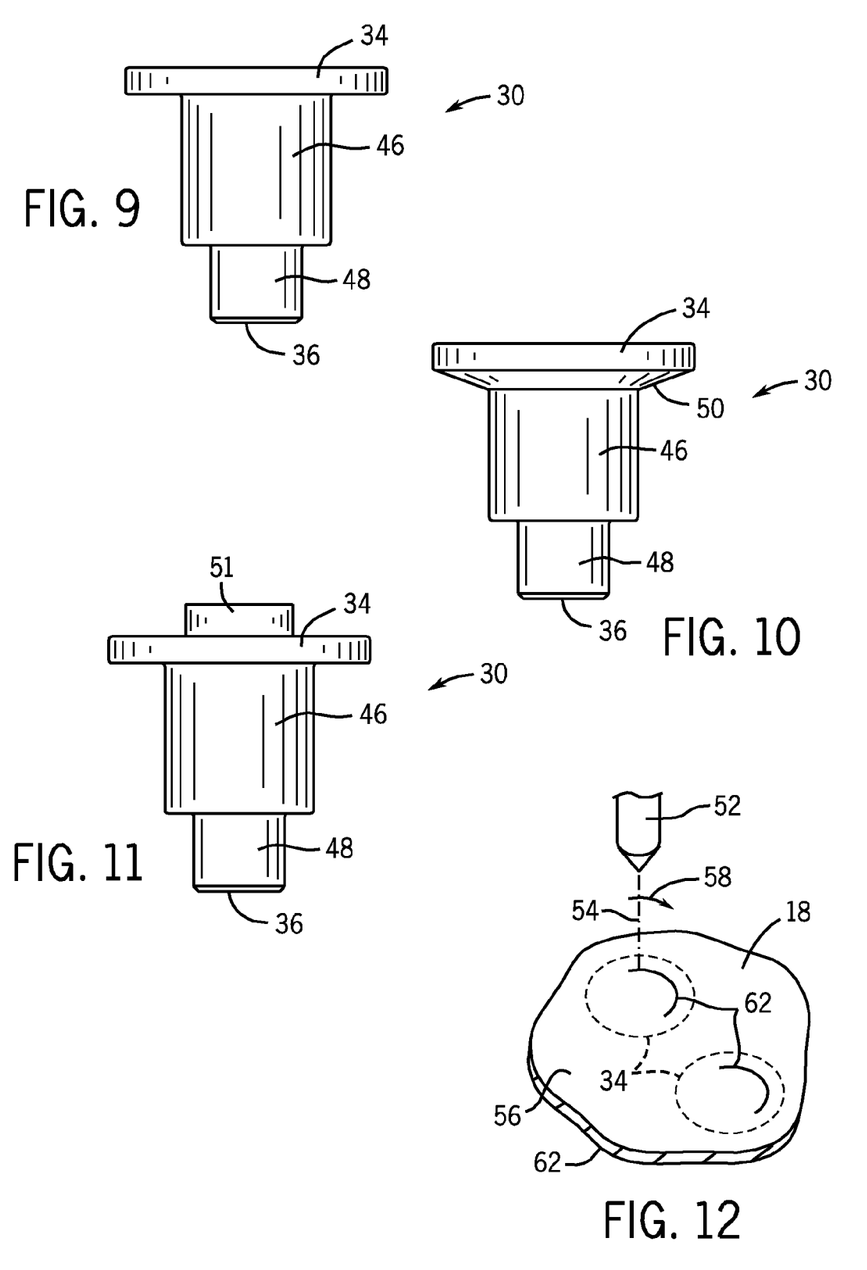
FIG. 9 is a side view of an embodiment of a rivet that may be used in the attachment mechanism of FIG. 3.
FIG. 10 is a side view of another embodiment of a rivet that may be used in the attachment mechanism of FIG. 3.
FIG. 11 is a side view of another embodiment of a rivet that may be used in the attachment mechanisms of FIG. 3.
FIG. 12 is an illustration of a process that may be used to affix the attachment mechanism of FIG. 3 to the frame.

FIG. 9 is a side view of rivet 30 illustrating flange 34, first standoff section 46, and second standoff section 48. Flange 34 extends radially outward from first standoff section 46 in a generally circular shape to provide additional surface area for attachment. However, in other embodiments, flange 34 may be of a rectangular, triangular, trapezoidal, or other suitable shape.

FIG. 10 is a side view of another exemplary rivet 30 illustrating a tapered section 50 between flange 34 and first standoff section 46. Tapered section 50 may promote flowing during heading and may improve load distribution. The tapered section may be provided on all or some of the rivets included in attachment mechanism 16. As may be appreciated, various configurations of rivets may be provided. For example, the relative dimensions of the standoff sections may vary. Further, additional standoff sections may be provided, as well as grooves, washers, and other intermediate attachment mechanisms.

FIG. 11 is a side view of another exemplary rivet 30 illustrating a locating feature 51 disposed on flange 34. Locating feature 51 may include a stepped portion that protrudes from flange 34. According to certain embodiments, locating feature 51 may fit into a complementary opening of side frame 18 to assist with locating rivet 30 on the desired section of side frame 18. Moreover, in certain embodiments, locating feature 51 may include an opening for receiving an assembly tool that fits through a corresponding opening of side frame 18.

FIG. 12 illustrates an exemplary process for affixing the rivets to the frame. A source 52 may direct a laser beam 54 towards an inboard side 56 of frame 18. The beam 54 may travel in a direction generally indicated by an arrow 58 to create a weldment 60. Weldment 60 may fuse an outboard side 62 of frame 18 to flanges 34 of the rivets. Of course, in other embodiments, the laser beam may be directed towards the outboard side of the frame to create weldments on the flanges of the rivets.

Figure 13:
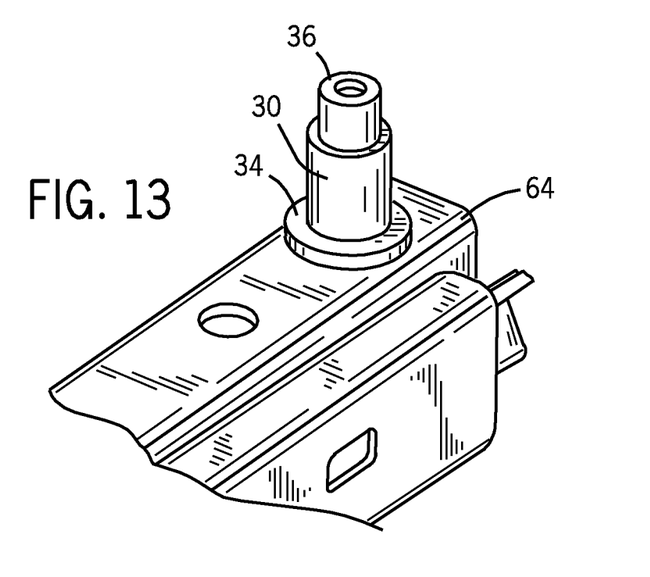
FIG. 13 is a perspective view of a seat track that may employ attachment mechanisms.

FIG. 13 depicts another exemplary application for the attachment mechanisms. In this application, one or more rivets 30 may be used to attach a seat assembly to a mounting track 64. Flange 34 may be welded to mounting track 64 and end 36 of rivet 30 may be riveted to a frame for a seat assembly.

Figure 14:
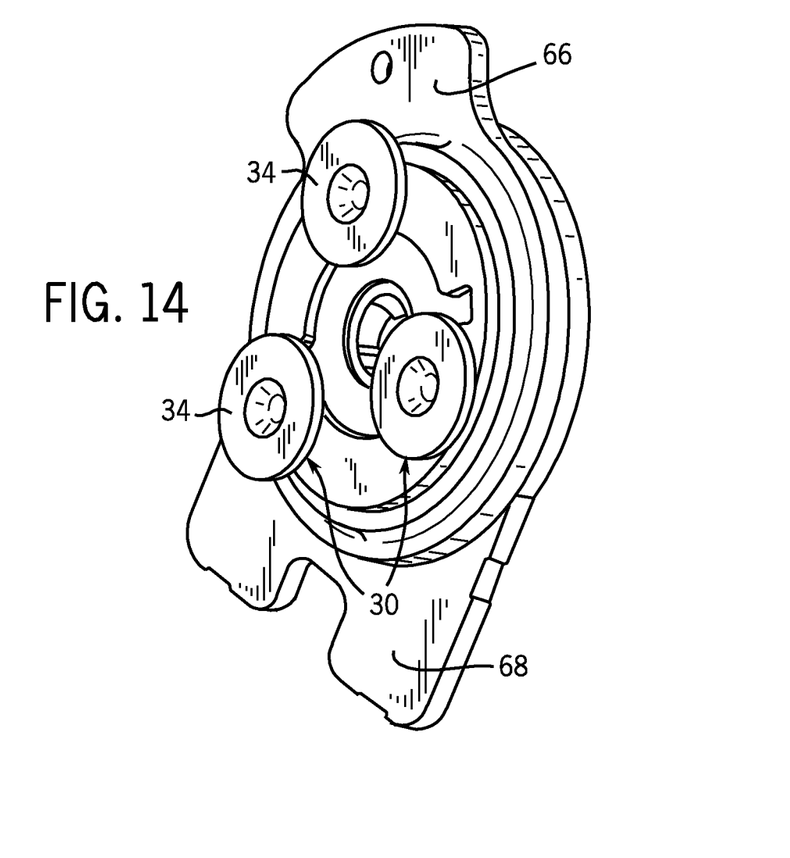
FIG. 14 is a perspective view of a recliner assembly that may employ attachment mechanisms.

FIG. 14 depicts another exemplary application for the attachment mechanisms. In this application, rivets 30 may be used to attach a recliner plate 66 to a frame 68 that may be used in a seat assembly. Rivets 30 may be inserted through recliner plate 66 and frame 68 and riveted to frame 68. Flanges 34 of rivets 30 may be laser welded to recliner plate 66.

The attachment mechanisms may find application in a variety of applications that benefit from welding and riveting. The weldable rivets within the attachment mechanisms are intended to provide enough surface area for laser welding while keeping the weight of the attachment mechanism low. The weldable rivets may provide many design and operational advantages over conventional attachment mechanisms. For example, the weldable rivets may promote load distribution, allow for the use of thinner materials, facilitate attachment to heat treated materials, allow for attachment of parts that are difficult to access, reduce fixturing, and improve manufacturing efficiency, among other things.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A riveted assembly comprising:
a rotatable seat back member;
a rotational joint member;
a mount member;
a first rivet having a first rivet portion secured to the rotational joint member, a first standoff portion having a first shoulder substantially surrounding the rivet portion and bearing against the rotational joint member, and a first flange portion having a first side and a second side opposite the first side, the first side being secured to an end of the first standoff portion opposite the first shoulder and the second side having a first weld surface welded to the rotatable seat back member;
a second rivet having a second rivet portion secured to the rotational joint member, a second standoff portion having a second shoulder substantially surrounding the rivet portion, a second flange portion having a third side and a fourth side opposite the third side, the third side being secured to an end of the second standoff portion opposite the second shoulder and the fourth side having a second weld surface welded to the seat back member, and an intermediate standoff portion between the second shoulder and the rotational joint member, the intermediate standoff portion having an intermediate shoulder bearing against the rotational joint member, wherein the intermediate standoff portion receives the mount member against the second shoulder to permit rotation of the rotatable seat back member and the rotational joint member together with respect to the mount member about a central axis of the second rivet.

2. The riveted assembly of claim 1, comprising a further rivet identical to the first rivet and secured identically to the rotatable seat back member and to the rotational joint member.

3. The riveted assembly of claim 1, wherein the flange portion of each rivet extends sufficiently radially beyond the respective standoff portion to permit welding of the flange portions to the seat back member by energy applied to the first side of the first flange portion or to the third side of the second flange portion.

4. The riveted assembly of claim 1, wherein the flange portion of each rivet is welded to the seat back member by energy applied to the seat back member in a region thereof contacting the flange portions.

5. The riveted assembly of claim 1, comprising a stationary member coupled to a seat bottom and rotatably coupled to the mount member to enable rotation of the seat back with respect to the seat bottom.

6. A riveted assembly comprising:
   a rivet having a rivet portion, a standoff portion having a shoulder substantially surrounding the rivet portion, and a flange portion having a first side and a second side opposite the first side, the first side being secured to an end of the standoff portion opposite the shoulder and the second side having a substantially flat weld surface configured to facilitate laser welding;
   a first structural member secured to the rivet portion by riveting of the rivet portion, the first structural member bearing against the shoulder; and
   a second structural member secured to the substantially flat weld surface of the flange portion by a laser weld and spaced from the first structural member by the standoff portion, wherein movement of the second structural member relative to the rivet in a direction away from the first structural member is blocked only by the laser weld.

7. The assembly of claim 6, wherein the flange portion extends sufficiently radially beyond the standoff portion to permit laser welding of the flange portion to the second structural member by energy applied to the first side of the flange portion.

8. The assembly of claim 6, wherein the flange portion is laser welded to the second structural member by energy applied to the second structural member in a region thereof contacting the flange portion.

9. The assembly of claim 6, wherein the standoff portion comprises an intermediate standoff portion between the shoulder and the flange portion, the intermediate standoff portion having a second shoulder.

10. The assembly of claim 9, comprising a third structural member mounted on the intermediate standoff portion and bearing against the second shoulder, wherein the intermediate standoff portion is a bearing surface for the third structural member, and wherein the first and second structural members are fixed with respect to one another and rotatable with respect to the third structural member about the bearing surface.

11. The assembly of claim 10, wherein the first structural member comprises a rotational joint member for folding a seat back onto a seat bottom, the second structural member comprises a frame of the seat back, and the third structural member comprises a recliner member for reclining the seat back with respect to the seat bottom.

12. The assembly of claim 10, wherein the first structural member comprises a recliner plate for reclining a seat back with respect to a seat bottom, the second structural member comprises a seat back frame member, and the third structural member comprises a seat bottom frame member.

13. The assembly of claim 6, wherein the first and second structural members comprise components of a rotating seat frame.

14. The assembly of claim 6, wherein the first structural member comprises a vehicle seat assembly, and wherein the second structural member comprises a seat mounting track.

15. A weldable rivet comprising:
   a rivet portion configured to be riveted to a first structural member;
   a standoff portion having a shoulder substantially surrounding the rivet portion to receive the first structural member; and
   a flange portion having a first side and a second side opposite the first side, the first side being secured to an end of the standoff portion opposite the shoulder and the second side having a substantially flat weld surface configured to be joined to a second structural member by a laser weld such that movement of the second structural member relative to the rivet in a direction away from the first structural member is blocked only by the laser weld.

16. The weldable rivet of claim 15, wherein the flange portion is configured to be joined to the second structural member by energy applied to the first side of the flange portion or to the second structural member in a region thereof contacting the flange portion.

17. The weldable rivet of claim 15, wherein the standoff portion comprises an intermediate standoff portion between the shoulder and the flange portion, the intermediate standoff portion having a second shoulder configured to receive and bear against a third structural member.

18. The weldable rivet of claim 17, wherein the intermediate standoff portion is a bearing surface for the third structural member, the first and second structural members being fixed with respect to one another, and rotatable with respect to the third structural members about the bearing surface.

19. The weldable rivet of claim 15, comprising a tapered section connecting the flange to the standoff portion.

20. The weldable rivet of claim 15, comprising a locating feature disposed on the second side of the flange portion.

* * * * *